(12) United States Patent
Ben-Simon et al.

(10) Patent No.: US 11,100,011 B2
(45) Date of Patent: Aug. 24, 2021

(54) FLASH TRANSLATION LAYER WITH HIERARCHICAL SECURITY

(71) Applicant: ALTAIR SEMICONDUCTOR LTD., Hod Hasharon (IL)

(72) Inventors: Yehuda Ben-Simon, Ramat Hasharon (IL); Omer Botvinik, Herzliya (IL); Avishay Sharaga, Beit Nehemya (IL); David Fishelovich, Beit Shemesh (IL)

(73) Assignee: SONY SEMICONDUCTOR ISRAEL LTD., Hod Hasharon (IL)

( * ) Notice: Subject to any disclaimer, the term of this patent is extended or adjusted under 35 U.S.C. 154(b) by 120 days.

(21) Appl. No.: 16/708,453

(22) Filed: Dec. 10, 2019

(65) Prior Publication Data

US 2020/0192826 A1    Jun. 18, 2020

Related U.S. Application Data

(60) Provisional application No. 62/778,918, filed on Dec. 13, 2018.

(51) Int. Cl.
*G06F 12/14* (2006.01)

(52) U.S. Cl.
CPC .............. *G06F 12/1491* (2013.01)

(58) Field of Classification Search
CPC .. G06F 3/0631; G06F 3/0679; G06F 12/0246; G06F 12/1441; G06F 12/1491; G06F 3/0614; G06F 2212/7207; G06F 2212/7204; G06F 2212/1052; G06F 12/14; G06F 2212/7201
See application file for complete search history.

(56) References Cited

U.S. PATENT DOCUMENTS

| 8,224,873 | B1 * | 7/2012 | Korablev | G06F 21/604 707/809 |
| 8,458,230 | B2 * | 6/2013 | Korablev | G06F 21/604 707/809 |
| 8,589,700 | B2 | 11/2013 | Herman et al. | |

(Continued)

FOREIGN PATENT DOCUMENTS

WO    2014123372 A1    8/2014

OTHER PUBLICATIONS

O. Hanka, G. Kunzmann, C. Spleiss, J. Eberspacher and A. Bauer, "HiiMap: Hierarchical internet mapping architecture," 2009 First International Conference on Future Information Networks, 2009, pp. 17-24.*

*Primary Examiner* — Pierre Miche Bataille
(74) *Attorney, Agent, or Firm* — Kligler & Associates Patent Attorneys Ltd

(57) ABSTRACT

A computing device includes a non-volatile memory (NVM) interface and a processor. The NVM interface is configured to communicate with an NVM. The processor is configured to store in the NVM at least (i) data entries including data and (ii) mapping entries including mapping information that indicate physical addresses in which the data entries are stored in the NVM, and to verify authenticity of the data entries and of the mapping entries using a hierarchical authentication scheme in which (i) the data entries include first authentication information that authenticates the data, and (ii) the mapping entries include second authentication information that authenticates both the mapping information and the data entries.

12 Claims, 10 Drawing Sheets

(56) References Cited

U.S. PATENT DOCUMENTS

| | | | | |
|---|---|---|---|---|
| 10,771,590 B2* | 9/2020 | Tomkins | ............... | H04L 67/327 |
| 2005/0102401 A1* | 5/2005 | Patrick | ............... | G06F 21/6218 |
| | | | | 709/225 |
| 2005/0257044 A1* | 11/2005 | Patrick | ................. | H04L 63/168 |
| | | | | 713/155 |
| 2006/0080440 A1* | 4/2006 | Vasandani | ............... | G06F 21/31 |
| | | | | 709/225 |
| 2009/0019519 A1* | 1/2009 | Kikuchi | ............... | H04L 9/3247 |
| | | | | 726/2 |
| 2012/0011165 A1* | 1/2012 | Coker | ................ | G06F 21/6227 |
| | | | | 707/792 |
| 2012/0084843 A1* | 4/2012 | Hernoud | ............... | G06F 21/602 |
| | | | | 726/5 |
| 2012/0324592 A1* | 12/2012 | Korablev | ............ | G06F 21/6218 |
| | | | | 726/30 |
| 2018/0302399 A1* | 10/2018 | Khanduja | ............... | H04L 69/26 |

* cited by examiner

FLASH TRANSLATION LAYER WITH HIERARCHICAL SECURITY

CROSS-REFERENCE TO RELATED APPLICATIONS

This application claims the benefit of U.S. Provisional Patent Application 62/778,918, filed Dec. 13, 2018, whose disclosure is incorporated herein by reference.

FIELD OF THE INVENTION

The present invention relates generally to Flash based computer systems, and particularly to secure Flash-based computer systems.

BACKGROUND OF THE INVENTION

In computer systems, the Flash Translation Layer (FTL) is an intermediate system made up of software and hardware that manages Flash memory operations. The FTL performs tasks such as logical-to-physical address translation, garbage collection and wear-leveling. Some FTLs also perform error correction coding (ECC), bad block management, encryption/decryption and authentication.

PCT International Publication WO 2014/123372 describes an FTL design framework with logs for data, mapping and checkpoint, which supports error recovery.

U.S. Pat. No. 8,589,700 describes systems and methods for whitening, encrypting and managing data for storage in non-volatile memories.

SUMMARY OF THE INVENTION

An embodiment of the present invention that is described herein provides a computing device including a non-volatile memory (NVM) interface and a processor. The NVM interface is configured to communicate with an NVM. The processor is configured to store in the NVM at least (i) data entries including data and (ii) mapping entries including mapping information that indicate physical addresses in which the data entries are stored in the NVM, and to verify authenticity of the data entries and of the mapping entries using a hierarchical authentication scheme in which (i) the data entries include first authentication information that authenticates the data, and (ii) the mapping entries include second authentication information that authenticates both the mapping information and the data entries.

In some embodiments, the processor is configured to verify the authenticity of the data entries and of the mapping entries in response to an initialization indication. In an embodiment, in response to writing data to the NVM, the processor is configured to update the hierarchical authentication scheme with (i) updated first authentication information reflecting the written data, and (ii) updated second authentication information reflecting the written data and the mapping information of the written data.

In a disclosed embodiment, in response to reading data from the NVM, the processor is configured to verify the authenticity of the read data using at least the first authentication information and the second authentication information. In an example embodiment, the processor is configured to update the hierarchical authentication scheme in an order that guarantees consistency of the data and the hierarchical authentication scheme in the event of a power interruption. In some embodiments, as part of the hierarchical authentication scheme, the processor is further configured to store in the NVM third authentication information that authenticates the mapping entries.

There is additionally provided, in accordance with an embodiment of the present invention, a computing method including storing in a non-volatile memory (NVM) at least (i) data entries including data and (ii) mapping entries including mapping information that indicate physical addresses in which the data entries are stored in the NVM. Authenticity of the data entries and of the mapping entries is verified using a hierarchical authentication scheme in which (i) the data entries include first authentication information that authenticates the data, and (ii) the mapping entries include second authentication information that authenticates the both the mapping information and the data entries.

The present invention will be more fully understood from the following detailed description of the embodiments thereof, taken together with the drawings in which:

DETAILED DESCRIPTION OF EMBODIMENTS

Overview

Figure 1:
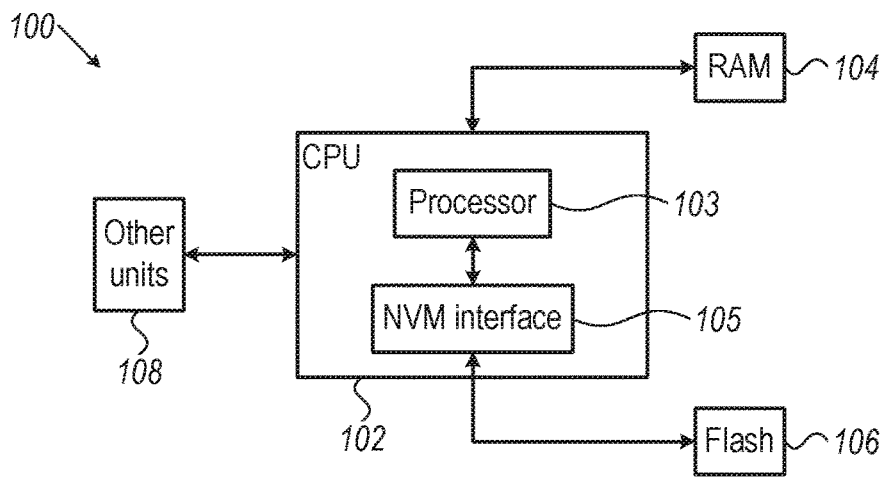
FIG. 1 is a block diagram that schematically illustrates a computer system, in accordance with an embodiment of the present invention.

Secondary storage of computer systems differs from primary storage (e.g., Random Access Memory—"RAM") in that it is not directly accessible by the Central Processing Unit ("CPU"). The computer usually uses its input/output channels to access secondary storage and transfer the desired data to primary storage. Secondary storage is typically non-volatile and, in some computer-systems, may include a much higher storage capacity than primary storage.

Traditionally, secondary storage was based on magnetic media (e.g., hard disk drives—HDD). Recently, however, computer systems rely on semiconductor non-volatile memory (e.g., Flash) for secondary storage, in addition or instead of traditional magnetic storage devices.

While providing large storage area at relatively low cost, Flash memories have some inherent limitations. In a typical Flash device, while any bit can be individually programmed to a first binary value (e.g., logic 1), programming to the second binary value (e.g., logic 0) must be done on larger blocks of memory, which are referred to as Pages (programming a page with the second binary value is referred to as Erasing the page). Consequently, if a page in the Flash is to be programmed with data, the CPU typically erases the flash, and then programs the desired data. If only part of the page is programmed with data, the CPU typically copies the page to a Random-Access Memory (RAM), modifies the part that is to be programmed, erases the page and then reprograms the erased page from RAM.

A second inherent weakness of Flash memories is aging (also referred to as "wear")—the number of times that cells can be reliably programmed/erased ("P/E cycles") is typically limited, for example to 100,000. If the same page is repeatedly programmed and erased, the life cycle of the page may terminate (and, consequently, the Flash device deemed non-functional) although the P/E cycle count of other pages may be low.

A third weakness of Flash memories, and, in particular, Flash memories that are external to the computer system (e.g., Flash devices that plug to the computer system through a Universal Serial Bus (USB) connector), is vulnerability to security attacks. Flash file systems may comprise cryptographic keys and signatures, and the flash driver may apply reliable authentication techniques; however, since programming and erasing take a relatively long period of time, an attacker can turn the power off in the middle of an erase or a program cycle, and, may, as a result, set the storage to an insecure state.

Embodiments of the present invention that are disclosed herein provide apparatuses and methods for secure and reliable Flash accesses of software programs that the CPU executes. According to embodiments, when the CPU executes a software program that accesses the Flash, the CPU may invoke a Flash interface software, referred to as Flash Translation Layer ("FTL"), which translates the accesses to the Flash of the software programs, transparently to the software programs, into a series of Flash-access (and, sometimes, maintenance) operations, designed to mitigate the Flash memory weaknesses and to bypass some of the Flash memory limitations.

FTLs in accordance with embodiments of the present invention implement a hierarchical security structure and provide high security level, including resiliency to power-interruption attacks. According to some embodiments, the FTL evenly distributes the Flash wear between Flash pages (referred to as "wear leveling").

In an embodiment, the Flash interface translates the address that the CPU sends when accessing the Flash (will be referred to hereinbelow as "logical address") into a physical address within the Flash device. The physical address space is larger than the logical address space, and the additional storage space is used, among others, to store tables, authentication codes (sometimes referred to as metadata) and other data (as will be described hereinbelow).

In an example embodiment, each group of 64 bytes, corresponding to a 64-byte segment in the logical address space, is appended by a 16-byte Message Authentication Code (MAC), to form an 80-byte Security Interface Code (SIC), wherein the MAC is used for data authentication. The MAC may be generated when the CPU encrypts the data segment (e.g., using Advanced Encryption Standard Galois/Counter Mode AES128-GCM).

In some embodiments according to the present invention, the Flash device comprises four types of pages: Data Pages, which are used to store CPU data; Pointer-Table (PT) pages, which are used to store translation pointers from logical to physical addresses (and some additional data, as will be explained below); An HMAC page, which is used to authenticate the PT pages; and, Free Pages, which are used in Write operations, for example when a data page is full. According to embodiments of the present invention, the authentication structure is hierarchical, and any change to any bit, in data pages and/or other page types, will be readily identified when the CPU hierarchically authenticates the Flash device.

The embodiments described herein refer mainly to an example implementation of a hierarchical authentication scheme as described above. The disclosed techniques, however, can be used for verifying the authenticity of data entries and mapping entries using various other hierarchical authentication schemes in which (i) the data entries comprise first authentication information that authenticates the data, and (ii) the mapping entries comprise second authentication information that authenticates the both the mapping information and the data entries. Such a hierarchical authentication scheme may also comprise third authentication information that authenticates the mapping entries. In the present example the first authentication information comprises MACs, the second authentication information comprises IVs, and the third authentication information comprises HMACS, purely by way of example.

Thus, according to embodiments of the present invention, the FTL translates CPU accesses to series of Flash access instructions, implementing physical to logical address translation, efficient wear levelling and a hierarchical security structure, which is protected against power interruptions.

System Description

Computer systems typically comprise a fast Primary-Storage, and a slower Secondary-Storage. In many cases, the primary storage is a volatile (that is—loses data when power is turned off) Random Access Memory (RAM), whereas the Secondary Storage is a Non-Volatile Memory (NVM) such as a Flash memory or a hard-disk-drive (HDD).

In the description hereinbelow, we will generally refer to Flash memory; however, embodiments of the present invention are not limited to Flash memories; in alternative embodiments any other suitable type of NVM can be used (e.g., an Electrically Erasable Programmable Read-Only-Memory (EEPROM)).

FIG. 1 is a block diagram that schematically illustrates a computer system 100, in accordance with an embodiment of the present invention. Computer system 100 comprises a Central Processing Unit (CPU) 102, also referred to as a computing device. Although the embodiments described herein refer mainly to a CPU, the disclosed techniques can also be implemented in various other computing devices such as memory controllers. System 100 further comprises a Random-Access Memory (RAM) 104, and a Flash Memory 106. Computer system 100 may further comprise other units 108, such as input/output, interfaces and others, which are not described and are not required for the disclosures hereinbelow.

CPU 102 typically accesses data that is stored in RAM 104 directly, by issuing memory access instructions. In contrast, accessing data that is stored in Flash 106 is not handled directly, and memory access instructions that target Flash-stored data must be translated to a series of Flash access and management instructions.

In the present example, CPU 102 comprises a NVM interface 105 for communicating with Flash 106, and a processor 103 that is configured to carry out the disclosed techniques.

According to embodiments of the present invention, the Flash memory can be erased or programmed. Erasure is done in a Page granularity (typically 4096 bytes), wherein all bits of the page are set to a first binary value (e.g., logic 1). Programming is done in a single-bit granularity, in groups of up to a Block (e.g. 80 bytes), wherein all designated bits are set to a second binary value (e.g., logic 0).

In embodiments according to the present invention, the number of times that each page of Flash 106 can be erased is limited (e.g. to 100,000 times). After any of the pages has reached the erase count limit, Flash 106 is deemed defective, even if some (or most or even all) of the other pages have been rarely (or even never) erased.

In some embodiments according to the present invention, Flash 106 is more vulnerable to security attacks such as data-stealing or data modification than RAM 104. Flash 106 retains data after power is interrupted, which gives hackers ample opportunity to manipulate the Flash, including, for example, copying the Flash and then analyzing its contents with powerful computers. Moreover, in some embodiments, Flash 106 may be manually removed and inserted into computer system 100, e.g., using a Universal Serial Bus (USB) connector. In contrast, RAM 104 loses its data when power is turned off, and is, therefore, much more protected (in some embodiments, RAM 104 and CPU 102 may be incorporated in the same integrated circuit, with yet better protection of RAM 104 data).

In embodiments according to the present invention, software programs that CPU 102 executes issue random access Flash memory read and write commands, obliviously to the limitations of the Flash memory, and a Flash Translation Layer (FTL) interface (in effect, a software driver) that sends commands to the Flash, responsive to the read and write commands that the software program issues, so that the access commands issued by the software programs will be executed. The FTL running on CPU 102 maintains a hierarchically secure structure of the data that is stored in the Flash, while evenly distributing the erase count of Flash pages between all pages.

As would be appreciated, the structure of computer system 100 described hereinabove is cited by way of example. Computer systems in accordance with the disclosed techniques are not limited to the description hereinabove. For example, in alternative embodiments, CPU 102 may be an aggregation of a plurality of CPUs; RAM 104 may be an aggregation of memories, some connected directly and other via busses; Flash 106 may be any other type of non-volatile memory (e.g., EEPROM) and NVM Express over Fabrics (NVMF)). In some embodiment, the software is loaded to RAM 104 from Flash 106; in other embodiments the software may be loaded through a network (not shown), through a serial link (not shown), or through a combination of channels.

In some embodiments, computer system 100 comprises a hardware security accelerator that is configured to calculate various security functions, such as an AES-128; in an embodiment, the hardware security accelerator is embedded within CPU 102.

Figure 2:
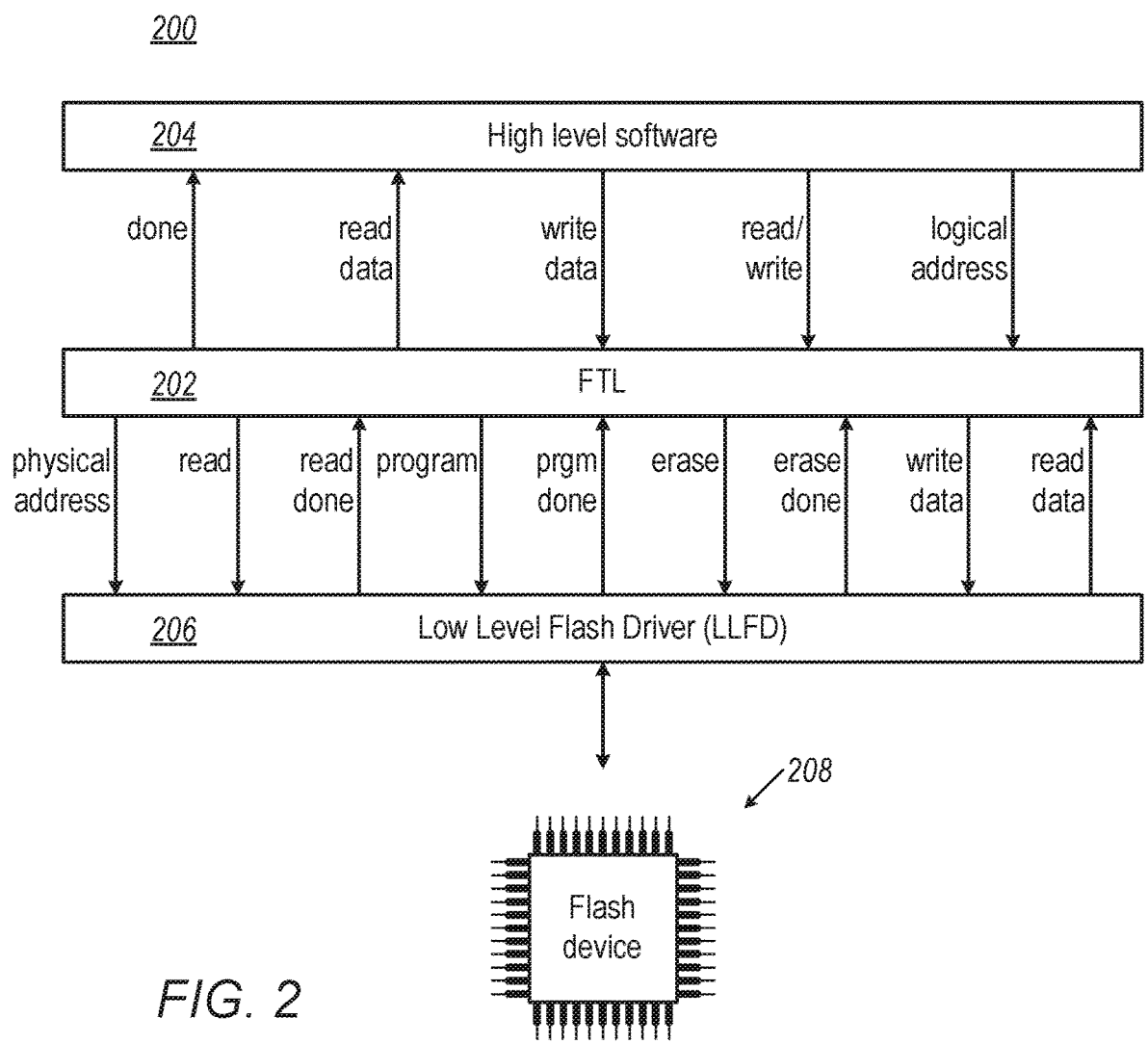
FIG. 2 is a block diagram that schematically illustrates the interfaces of a Flash Translation Layer (FTL), in accordance with an embodiment of the present invention.

FIG. 2 is a block diagram 200 that schematically illustrates the interfaces of a Flash Translation Layer (FTL), in accordance with an embodiment of the present invention. FTL 202 is invoked by a high-level software 204, and, in turn, invokes a low-level Flash driver (LLFD) 206 that directly communicates with a Flash device 208. FTL 202, high-level software 204 and LLFD 206 all run on processor 103 of CPU 102.

According to embodiments of the present invention, high level software 204 accesses Flash 208 by calling FTL 202, with the following parameters—logical address within the Flash, read or write indication to a read or a write cycle, and, in the case of a write cycle, the data to be written (in some embodiments, high level software 204 may also indicate the width of the data to be read or written; e.g., a byte, two bytes, four bytes etc.). The FTL will, upon completion, return to the calling program the read data (in case of a read operation), and a completion indication.

FTL 202 translates the commands from High-Level Software 204 to low level Flash operations. In the example embodiment of FIG. 2 the low-level operations are not atomic Flash commands and, therefore, are not directly input to Flash Device 206. Rather, the FTL calls LLFD 206, which further breaks the Flash operation that the FTL issues to atomic Flash commands. For example, in some embodiments, the LLFD may break a Program command that the FTL issues to a series of program/verify instructions that repeat until the verification passes.

When the FTL calls the LLFD, the FTL passes to the LLFD parameters which include, according to the example embodiment of FIG. 2, the physical address, a Read indication, a Program indication, an Erase indication and, in case of a Program, the data to be programmed ("write data"). According to the example embodiment of FIG. 2, only one of Program, Erase or Read may be indicated (it should be noted that when write-data comprises bits at logic-1 and bits at logic-0, only one level (e.g., logic 0) is programmed; the other bits are not programmed, and are assumed to be pre-erased).

LLFD 206 returns to the FTL a read-done indication, a program-done indication, an erase-done indication and, in the case of a Read, the read data.

In alternative embodiments, interface from the high level software to the FTL and/or from the FTL to the LLFD may comprise, instead of explicit write and read data, a pointer to a memory buffer from which the write data should be read, and/or a pointer to a memory buffer into which the read data should be written, with length indicators.

Thus, according to the example embodiment illustrated in FIG. 2, high level software that the CPU executes writes and reads Flash data by passing direct read and write instructions, with data and address to the FTL, and receiving the read data from the FTL. The operation of the FTL, including address translation, encryption, decryption, hierarchical authentication and wear levelling is transparent to the calling software.

As would be appreciated, the interfaces of FTL 202 described hereinabove are cited by way of example. FTL drivers in accordance with the disclosed techniques are not limited to the description hereinabove. For example, in alternative embodiments, the functions of LLFD 206 may be integrated in FTL 202. In another embodiment, LLFD 206 may be integrated in Flash Device 208. In some alternative embodiments other suitable parameters may be passed between high level software 204 and FTL 202, and between FTL 202 and LLFD 206.

In some embodiments, FTL 202 is wrapped by a higher hierarchy driver, such as a file system running on CPU 102, which allows the software programs to execute file operations (e.g., file-open) on data that is stored in the Flash. In other embodiments, the interface from high level software 204 to FTL 202 may comprise diagnostics commands; for example, in an embodiment, the FTL may indicate that the wear counts of pages have reached (or are close to) the specified maximum erase count of the Flash Device.

Figure 3:
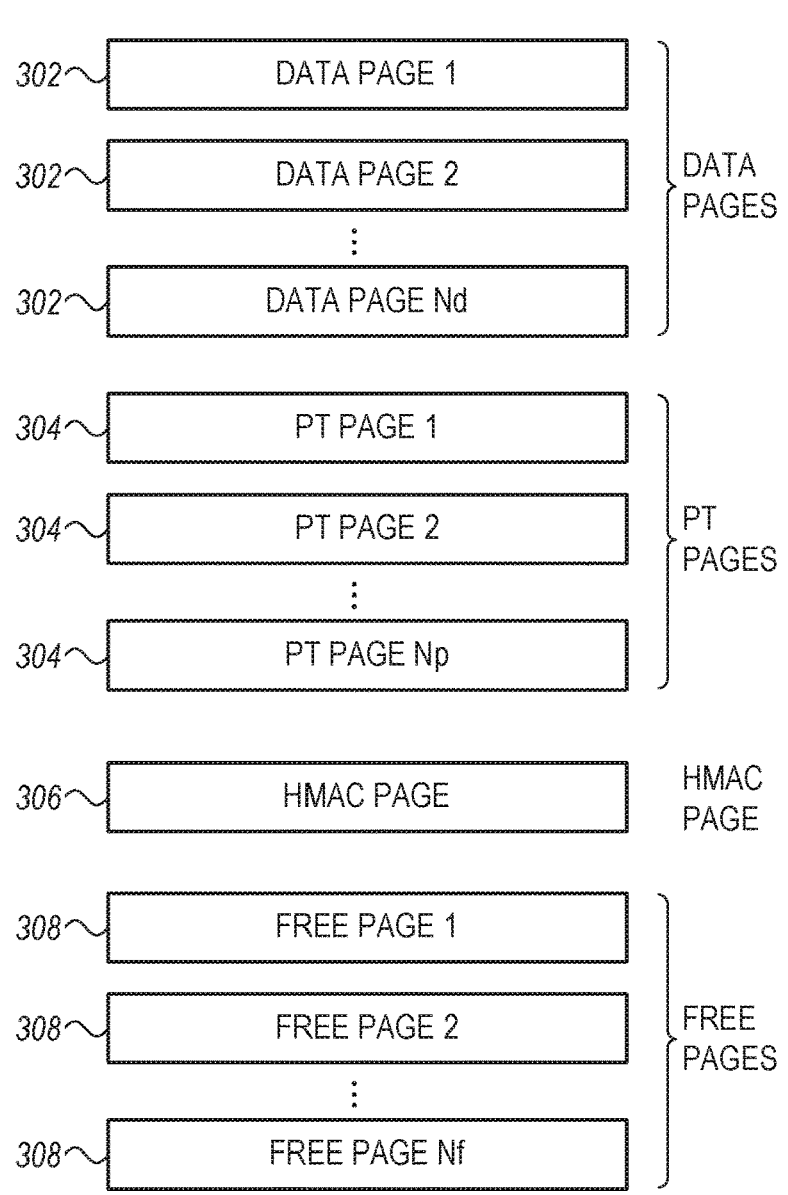
FIG. 3 is a block diagram that schematically illustrates pages in the Flash Device, in accordance with an embodiment of the present invention.

FIG. 3 is a block diagram 300 that schematically illustrates pages in the Flash Device, in accordance with an embodiment of the present invention.

As would be appreciated, Flash Device 208 (FIG. 2) may comprise additional pages that are not defined in the example embodiment of FIG. 3. Such pages are not shown and are beyond the scope of the present disclosure. For example, boot code and security signatures may be stored in the Flash and accessed using an interface different than the FTL (or, in some embodiments, the FTL may be expanded to access the additional pages). In the disclosure hereinbelow, we will assume that such other pages, if exist, are stored in a separate partition (or partitions) of the Flash device.

In the example embodiment illustrated in FIG. 3, the Flash device comprises four types of pages: data pages 302, which store encrypted user data and metadata; Pointer-Table (PT) pages 304, which store mapping information; an HMAC page 306, which stores a security signature of the PT pages; and, Empty Pages 308. During the operation of the device, pages dynamically change function; for example, a Data Page may be emptied and turn into an Empty Page, an Empty Page may become an HMAC page, etc. In the example embodiment illustrated in FIG. 3, there are Nd data pages (e.g., 98), Np PT pages (e.g., 30), Nf free pages (e.g., 4) and one HMAC page.

A Hierarchical security structure is implemented in the Flash pages, wherein the data pages are authenticated using data (e.g., an initial vector) from the PT pages, and the PT pages are authenticated using a signature that is stored in the HMAC page.

Figure 4:
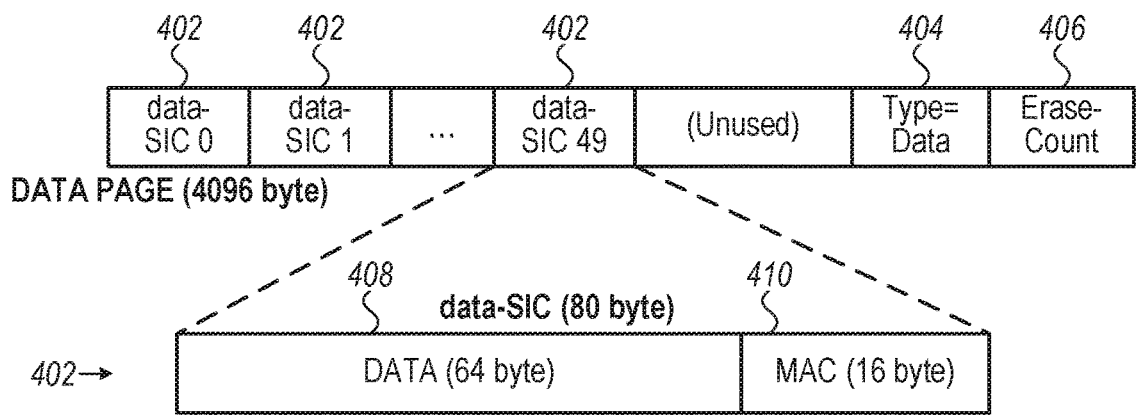
FIG. 4 is a block diagram that schematically illustrates the structure of a Data Page, in accordance with an embodiment of the present invention.

FIG. 4 is a block diagram that schematically illustrates the structure of a Data Page 302, in accordance with an embodiment of the present invention.

In the example embodiment illustrated in FIG. 4, each data page comprises 50 80-byte data-SIC fields 402, a single one-byte page-type field 404 and a single 4-byte Erase-Count field 406 (according to the example embodiment illustrated in FIG. 4 the data page further comprises 91 unused bytes, for a total of 4096 bytes in each data page).

Each Data-SIC field 402 comprises a 64-byte Data Field 408, and a 16-byte MAC field 410 that is calculated over the respective 64-byte Data Field. The data field and the MAC field are generated, for example, using AES128-GCM, with an Initial Vector (IV) that is stored in a PT page.

Figure 5:
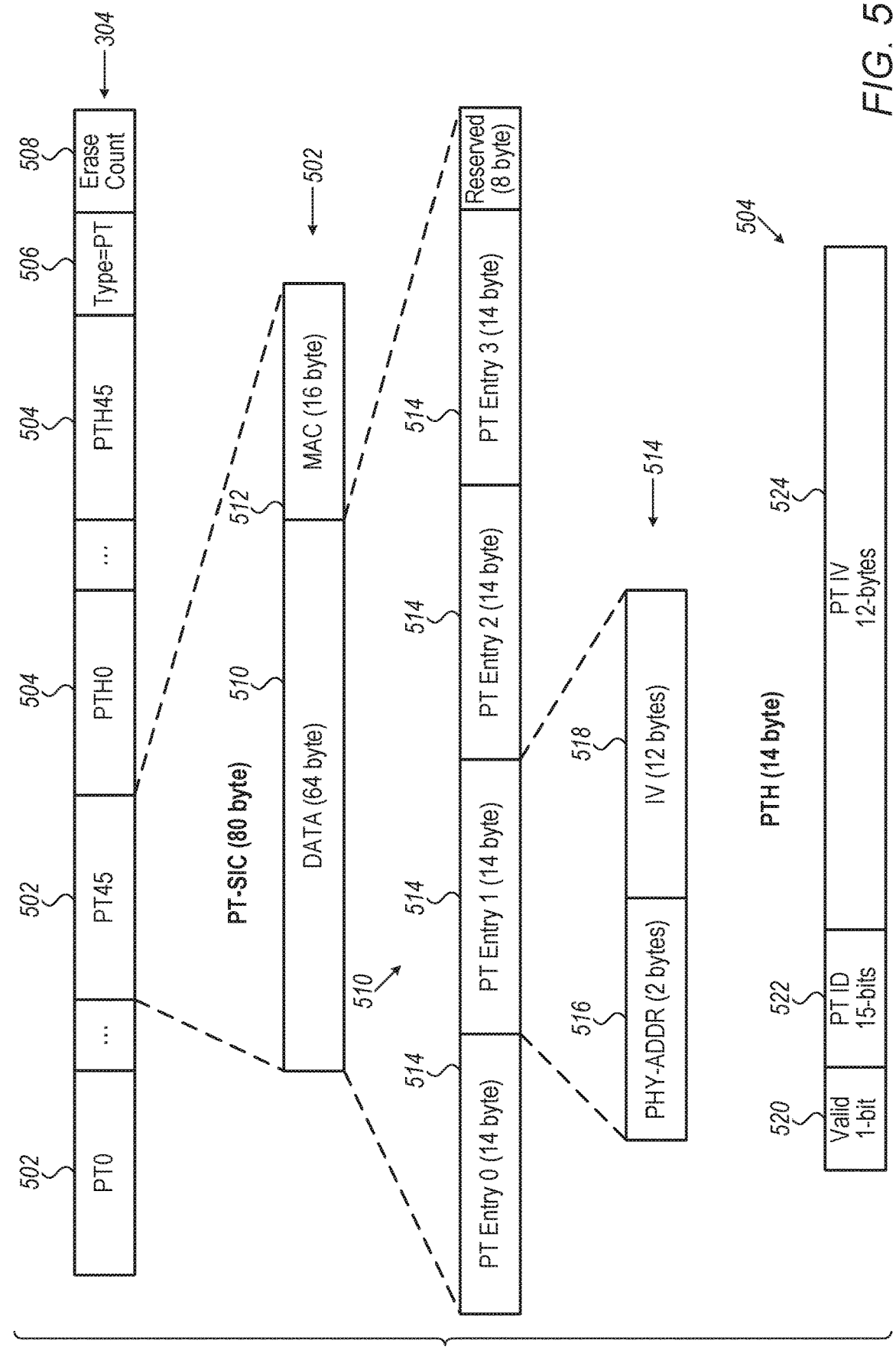
FIG. 5 is a block diagram that schematically illustrates the structure of a PT Page, in accordance with an embodiment of the present invention.

FIG. 5 is a block diagram that schematically illustrates the structure of a PT Page 304, in accordance with an embodiment of the present invention.

In the example embodiment illustrated in FIG. 5, each PT page comprises a plurality of Pointer-Table Security Information Code (PT-SIC) fields 502; a plurality of Page-Table-Header (PTH) fields 504; a Type-Field 506, which indicates that the current page is a PT page; and, an Erase-Count field 508, which keeps track of the number of times that the current page has been erased.

Each PT-SIC 502 comprises 80-bytes—a 64-byte PT-Data field 510 and a 16-byte MAC field 512, which is used to authenticate the PT-data field. Each PT-Data field 502 comprises four 14-byte PT entry fields 514 (and several unused bits). Each PT Entry 514 comprises a 2-byte Physical-Address field 516, which points to the address of a Data-SIC in a Data Page (in 64 byte resolution); and, a 12-byte IV field 518, which is used for the authentication and encryption/decryption of the corresponding Data-SIC.

Each PTH field 504 is associated with one of PT-SIC fields 502, and stores metadata for the corresponding PT-SIC. PTH field 504 comprises a Valid bit 520, which indicates whether the current PTH and the corresponding PT-SIC contain Valid Data; a 15 bit PT-ID field 522, which stores the logical address (in 64-byte resolution) that corresponds to the current PT-SIC and PTH; and, a 12-byte PT IV, which is uses in the authentication and encryption/decryption of the PT-SIC.

In an alternative embodiment (which is more efficient), two consecutive PT-SICs 502 point to a group of nine PT entries 512, which occupy 9×14=126 bytes; the reserved field comprises 2 bytes.

Figure 6:
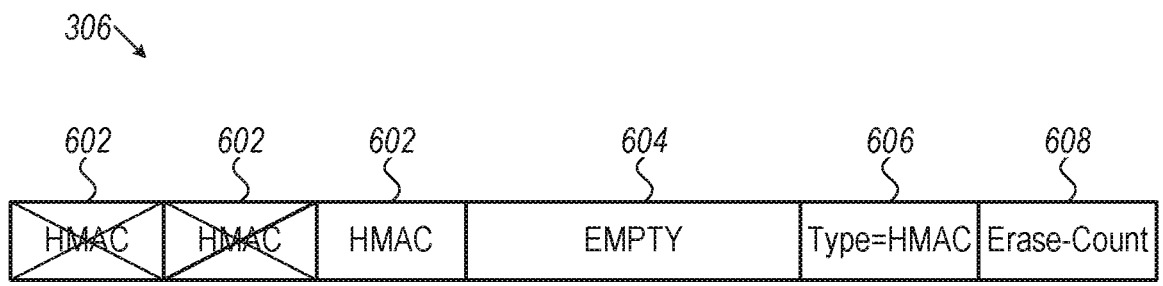
FIG. 6 is a block diagram that schematically illustrates the structure of a Hashed Message Authentication Code (HMAC) Page, in accordance with an embodiment of the present invention.

FIG. 6 is a block diagram that schematically illustrates the structure of a HMAC Page 306, in accordance with an embodiment of the present invention. The HMAC page comprises HMAC signatures 602 that are calculated on all PT headers, an empty space for additional HMAC signatures 604, a Type field 606 that indicates that the current page is HMAC, and an Erase Count field 608, which keeps track of how many times the current page has been erased. According to the example embodiment illustrated in FIG. 6, each HMAC signature comprises 32 bytes, the page-type field comprises one byte, and the erase-count field comprises four bytes.

New HMAC entries (like other entries in other Flash pages) are written in the empty space in the page, and older entries are marked Invalid The HMAC entries store a security signature of the PT table (in RAM), which, in turn, store the IV of the Data-Pages. Thus, the security structure is hierarchical, and any change in any page-data, PT or HMAC—will be detected by hierarchically authenticating the Flash device.

Figure 7:
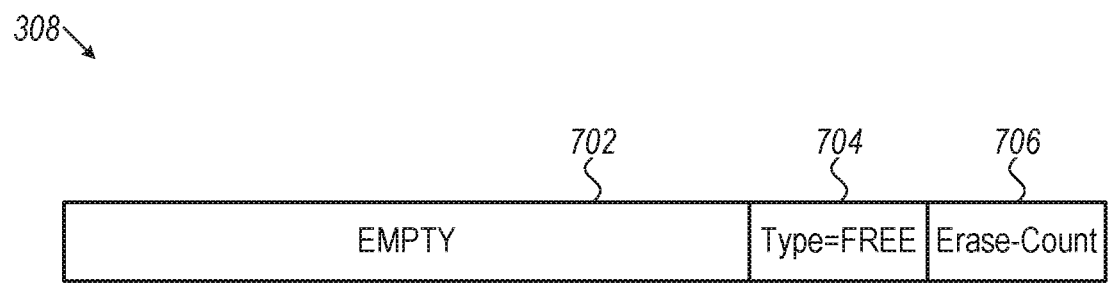
FIG. 7 is a block diagram that schematically illustrates the structure of a Free page, in accordance with an embodiment of the present invention.

FIG. 7 is a block diagram that schematically illustrates the structure of a Free page 308, in accordance with an embodiment of the present invention. The Free pages can change their type to a data-page, a PT-page or a HMAC page; hence, the Free pages must maintain the Erase Count (in embodiments, the Free Page type code is all-1 (erased), and, hence, when a page is erased, it will be Free until the Type field is changed). Accordingly, a Free Page 308 comprises an Empty field (e.g. 4091 of the 4096 bytes of the page); a one-byte Type field, which indicates that the current page is Free; and, a four-byte Erase-Count, which keeps track of the number of times that the page has been erased.

Thus, according to the block diagrams illustrated in FIGS. 3-7, the Flash device is divided to 4096-byte pages, including data pages, PT tables, an HMAC page and Free pages. To mitigate the limitations of the Flash, new entries are programmed in empty fields in the data, PT and HMAC pages, avoiding frequent erasures.

Since writing is done by concatenating information into the page, power interruption during the write transaction will be ignored—when power is restored the interrupted write will fail either MAC authentication, PT-MAC authentication or HMAC authentication. The interrupted write will, therefore, be discarded and the FTL will recover by validating the previous HMAC.

Each page keeps track of the number of erasures, so that a wear-levelling algorithm (to be described hereinbelow) can be employed to evenly distribute the erasures between the pages. The authentication structure is hierarchical, so that the CPU can hierarchically authenticate the complete Flash device.

As would be appreciated, the structure of pages in Flash Device 106 described with reference to FIGS. 3-7 hereinabove are cited by way of example. Flash pages in accordance with the disclosed techniques are not limited to the description hereinabove. For example, in alternative embodiments, a data page may comprise 51 data-SICs, a three-byte erase-count field and a one-byte type field, with 12 unused bytes. In other embodiments, a Flash page may have 8192 bytes (in which case the other numbers mentioned hereinabove change accordingly).

In some embodiments, error-correction codes may be added in some or in all the pages. Lastly, in an embodiment, the CPU may mark some pages as faulty (e.g., if the CPU gets an indication from LLFD 206 (FIG. 2) that a Program or an Erase have failed); the CPU will then use other pages from the Free pages pool.

As would be appreciated, in embodiments according to the present invention the Flash device may comprise additional pages which are not described, in the same or in other partitions of the Flash. The additional pages may store encrypted or clear data of any form.

We will now proceed to describe methods for formatting, initializing, reading, writing and wear-levelling the Flash device, in embodiments according to the present invention. For clarity of the descriptions, some non-essential steps are omitted from the descriptions hereinbelow.

Formatting

According to embodiments of the present invention, when a Flash device is formatted, the CPU first erases all Flash pages; then, for each page, sets the correct page type (DATA/PT/HMAC or FREE) and initializes the erase count. The CPU then builds (in the RAM) the PT table, the valid-SIC entries per page table and the next-SIC-pointer table. Lastly, the CPU calculates the HMAC signature (of the PT Table in RAM) and programs it in the first MHAC entry.

The number of Data Pages, PT pages and Free pages will be referred to, respectively, as Nd, Np and Nf (the number of HMAC pages is one). In an example embodiment, Nd=96, Np=30 and Nf=4.

Figure 8:
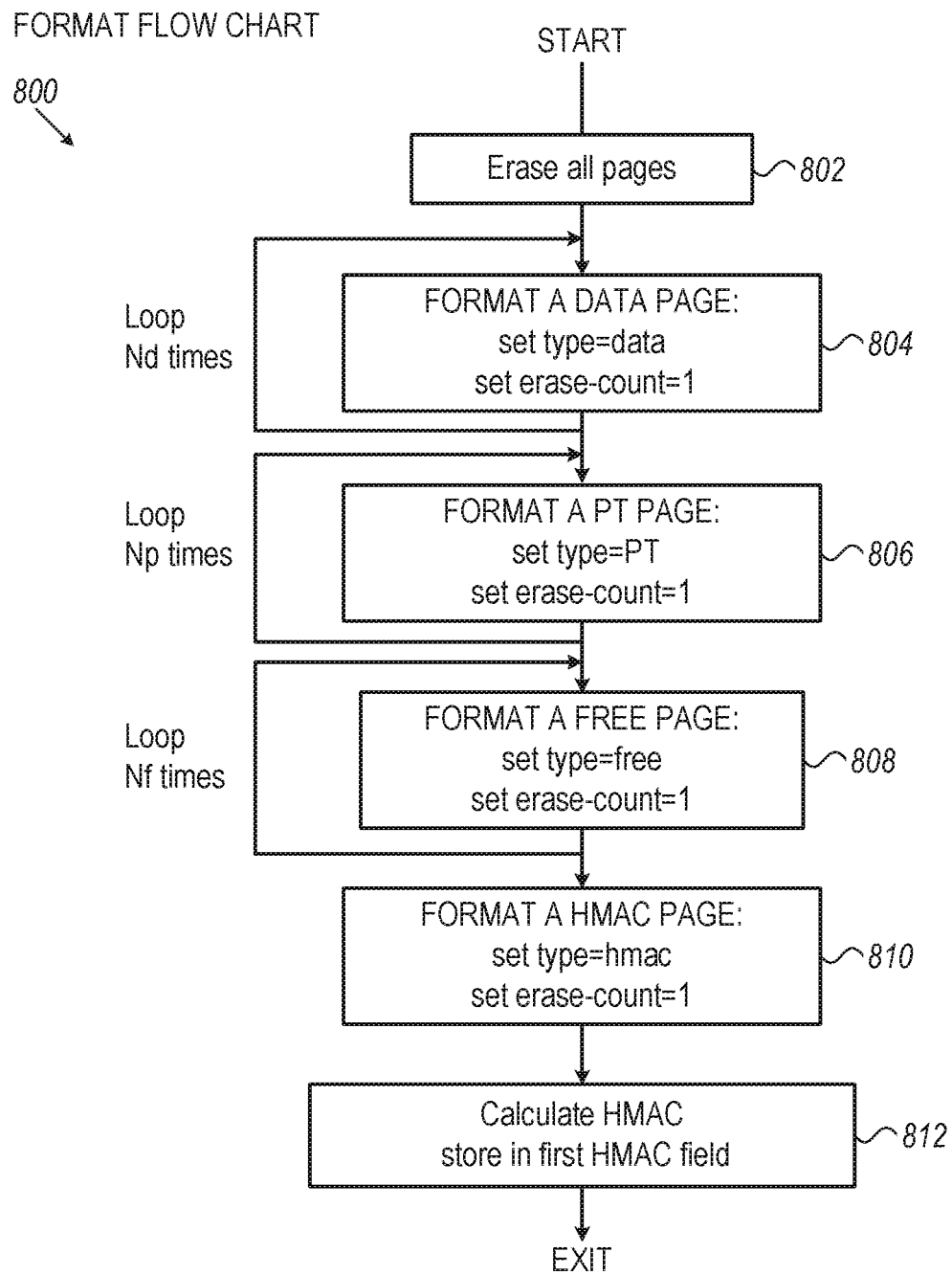
FIG. 8 is a flow chart that schematically illustrates a method for formatting Flash devices, in accordance with an embodiment of the present invention.

FIG. 8 is a flowchart 800 that schematically illustrates a method for formatting Flash devices, in accordance with an embodiment of the present invention. The flow chart is executed by CPU 102 (FIG. 1).

The flow chart starts at an Erasing All Pages step 802, wherein the CPU erases all the pages (starting from a first page). In some embodiments, the CPU first checks if the flash is already erased, to save time (and erasures) if the Flash is new.

Next, the CPU enters a Formatting a Data-Page step 804, wherein the CPU programs the type field of the current page to indicate that the page is a data page, and the erase count field of the page to indicate that the page has been erased one time (the erasure done in step 802). The CPU loops through step 804 Nd times to format Nd data pages.

The formatting of the data pages by looped execution of step 804 is repeated for the PT pages and for the Free pages. To format Np PT pages, the CPU loops Np times through a Formatting PT page step 806 (with the type field set to indicate a PT page and the erase count set to 1). To format Nf Free pages, the CPU loops Nf times through a Formatting Free page step 808, with the type field set to indicate a Free page (or unchanged, if the code for a free page is all-1) and the erase count set to 1.

The formatting of the single HMAC page is similar—the CPU enters a Formatting HMAC page step 810 and sets the type and erase count. Lastly, the CPU enters a Calculating and Programming HMAC step 812, wherein the CPU calculates the HMAC signature of the PT Table (in the RAM), and programs the result in the first HMAC entry of the HMAC page.

Thus, according to the example flow chart illustrated in FIG. 8, upon Flash formatting, the CPU prepares Nd data pages, Np PT pages, a single HMAC page and Nf free pages, wherein Nd+Np+Nf+1 equals the number of Flash pages that the FTL uses (which may be smaller or equal to the number of available Flash pages). The first entry of the HMAC page is programmed with the HMAC signature of the PT Table that the CPU reads from the RAM.

As would be appreciated, the format flowchart described hereinabove is cited by way of example. Format flows in accordance with the disclosed techniques are not limited to the description hereinabove. In alternative embodiments, for example, formatting may start by testing the Flash device, indicating bad pages, which will then be skipped. In other embodiments, formatting may be followed by a Flash test. In yet other embodiments the order of the format flow steps may change.

Initialization

According to embodiments of the present invention, upon system initialization (e.g., power-up reset) the Flash Driver scans the Flash device and validates the PT pages. Next, the Flash Driver prepares in the RAM an initial PT-table and an initial valid-entries-per-page table (both will be described hereinbelow). Lastly, the Flash driver finds the next empty place into which the next data, the next PT and the next HMAC will be written and stores corresponding pointers in the RAM.

Figure 9:
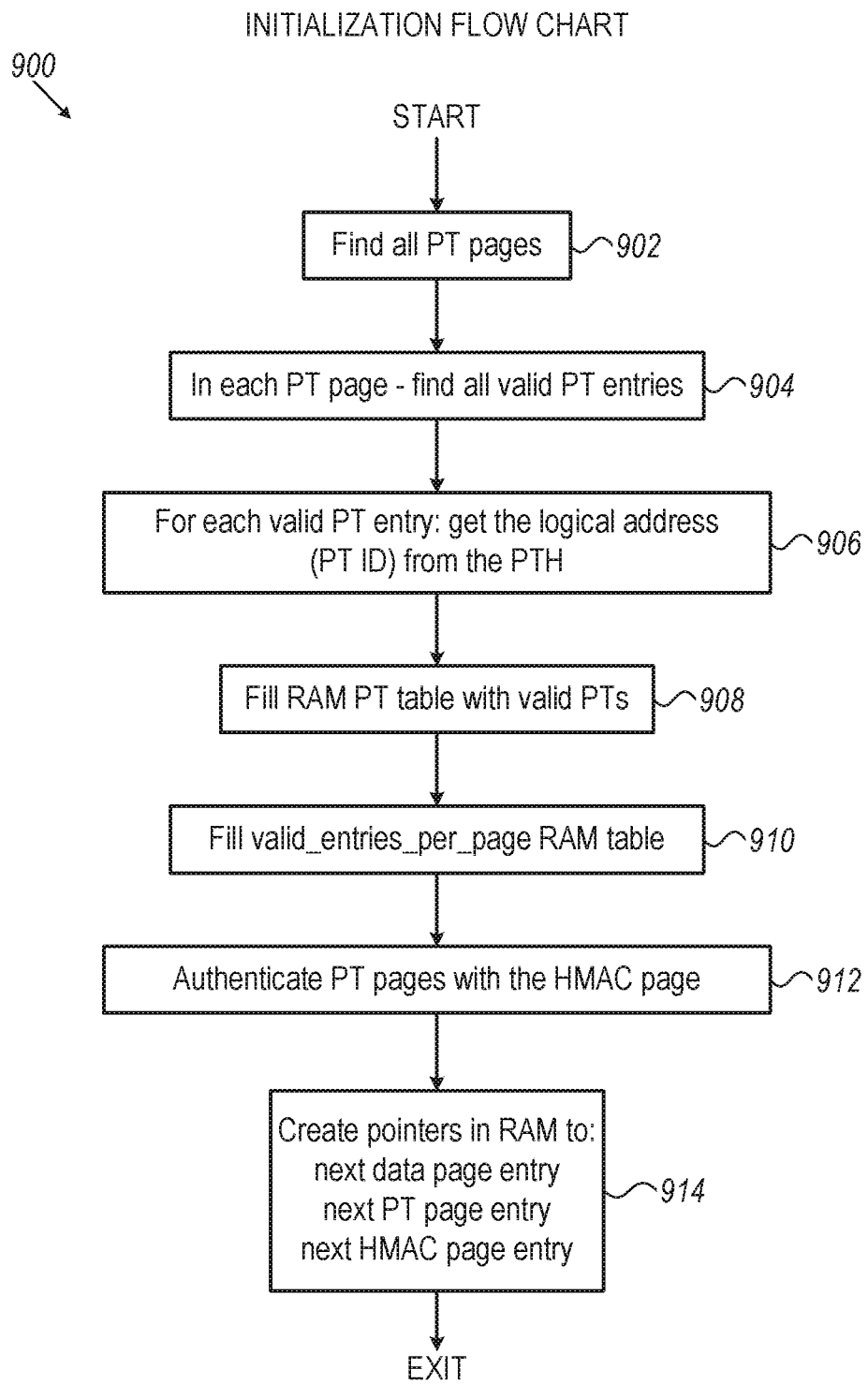
FIG. 9 is a flow chart that schematically illustrates a method for initializing Flash devices, in accordance with an embodiment of the present invention.

FIG. 9 is a flowchart 900 that schematically illustrates a method for initializing Flash devices, in accordance with an embodiment of the present invention. The flowchart is executed by CPU 102, which typically enters the initialization flow upon reset such as power-on reset, upon software command, or in response to any other suitable Initialization Indication. The flow starts at a Finding PT pages step 902, wherein the CPU scans all Flash pages, looking for a Type field that indicates a PT page. Next, in a Finding Valid PT Entry step 904, the CPU searches for valid PT entries in each PT page (Valid field 520 of PTH 504, FIG. 5). Then, in a Getting Logical Address step 906, the CPU reads PT-ID field 524, which indicates the logical address (in 64-byte resolution) of the PT entry. The CPU then, in a Filling-RAM-PT-Table step 908, writes the address of the PT-SIC in the RAM, in an index that is derived from the logical address that was found in step 906.

After step 908, the CPU enters a Filling Valid-Entries-Per-Page step 910, wherein the CPU checks the number of valid entries in each data page and each PT page. The CPU derives the number of valid entries for each PT page by counting PTH with set Valid bit. For the data pages, the CPU derives the number of valid entries for a given data page by counting the number of set valid bits in the PTH fields corresponding to all PT entries that point to the given data page. The CPU write the number of valid entries in the RAM.

After step 910, the CPU enters an Authenticating PT Pages step 912, wherein the CPU calculates the signature (e.g. 128 bits of an SHA256 hash) and compares the result to the valid HMAC from the HMAC page. In case the signature does not match, the CPU will first assume that power has been dropped during the last time that the Flash has been written, and take measures to recover (as will be described hereinbelow); if the measures fail, the CPU may abort or otherwise inform a user that security has been breached. If the signatures match, the CPU enters a Creating Next Entry Pointers step 914, wherein the CPU creates pointers to the next data-page, PT-page and HMAC page entries, and stores the pointers in the RAM. The CPU can create the pointers, for example, using the following algorithm:

i) scan all data pages, from the Type field backwards, and look for the last entry that is not erased (assuming a valid MAC field is always distinguishable from an empty field, because it can never be all-1);

ii) the pointer to the next data-page entry is the last non-empty entry in the first data page when empty entries are found;

iii) repeat steps i, ii for the PT pages;

iv) repeat steps i, ii for the single HMAC page.

After step 914, the flow ends.

It should be noted that, following power interruption during a write operation, some abnormalities in the data structure may occur. As will be described below, the FTL will discover the abnormalities during authentication, and may then revert to the data prior to the failed write, losing the last written data but preserving integrity.

Thus, according to the example embodiment illustrated in FIG. 9, upon initialization, the CPU hierarchically authenticates the Flash, and builds RAM tables and pointers to allow efficient and secure reading and writing from the Flash device.

As would be appreciated, the initialization flowchart described hereinabove is cited by way of example. initialization flows in accordance with the disclosed techniques are not limited to the description hereinabove. In alternative embodiments, for example, the order of the steps may vary, and some steps may be merged, omitted or replaced by alternative suitable steps.

RAM Table and Pointers

According to embodiments of the present invention, the Flash Driver prepares (during initialization) and maintains (during run time) pointers and tables in the RAM (the size of the tables is significantly smaller than the size of the corresponding information stored in the Flash).

Figure 10:
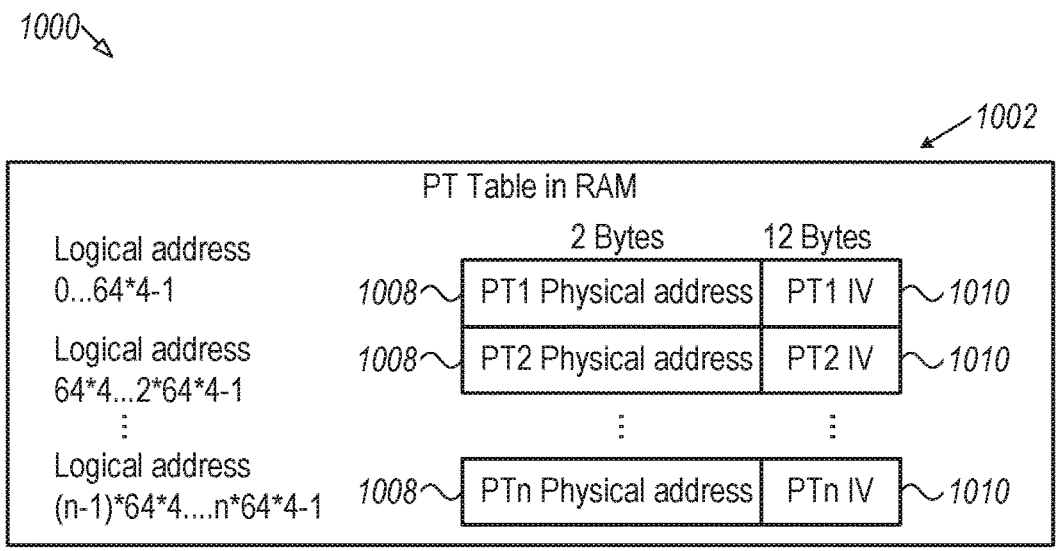
FIG. 10 is a block diagram that schematically illustrates RAM data that the FTL uses, in accordance with an embodiment of the present invention.
Figure 10:
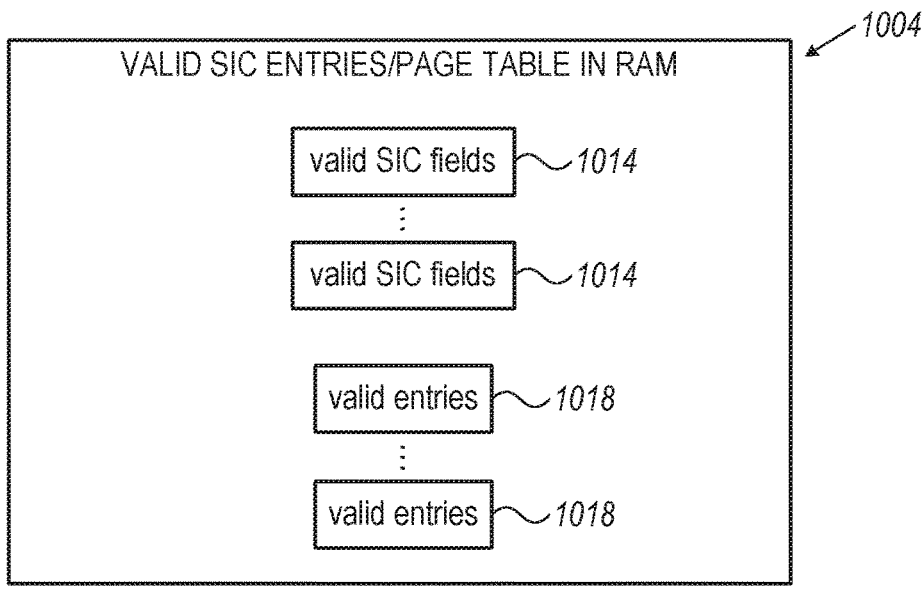
Figure 10:
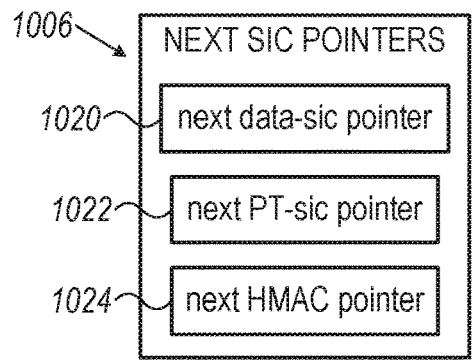

FIG. 10 is a block diagram that schematically illustrates RAM data 1000 that the FTL uses, in accordance with an embodiment of the present invention. The CPU fills the RAM data upon initialization, as was described hereinabove (with reference to FIG. 9) and updates the RAM data following Write and Wear-Levelling operations, as will be described hereinbelow.

RAM data 1000 comprises a PT Table 1002, a Valid-Entries-Per-Page table 1004 and Next-SIC-Pointers 1006.

PT-Table 1002 comprises a plurality of entries, one for each possible logical address (in increments of 64 bytes). Each PT-Table entry comprises a 2-byte Physical Address field 1008, which stores a pointer to the corresponding PT entry address, and a 12-byte PT-IV field 1010, which specifies the initial vector for the PT MAC.

Valid-SIC-Entries-per-Page 1004 comprises a plurality of Valid SIC Fields entries 1014, which indicates how many valid SIC fields are stored in the corresponding data page.

Valid-SIC-Entries-per-Page 1004 further comprises a plurality of entries, one for every PT page. Each entry comprises a one-byte Valid SIC Fields entry 1018, which indicates how many valid SIC fields are stored in the corresponding PT page.

Lastly, Next SIC Pointers 1006 comprises a Next Data SIC Pointer 1020, which points to the next free data SIC; a Next PT SIC Pointer 1022, which points to the next free PT SIC; and, a Next HMAC Pointer 1022, which points to the next free HMAC field.

As would be appreciated, the block diagram of the RAM data described hereinabove is cited by way of example. RAM data structures in accordance with the disclosed techniques are not limited to the description hereinabove. Any other suitable structure of the tables and the pointers may be used in alternative embodiments.

Read Flow

According to embodiments of the present invention, when the high level software requests a read operation from a logical address, the FTL reads the address and the IV of the corresponding PT entry from the RAM, decrypts and authenticates the PT in the Flash, gets read address and IV from the corresponding PT entry in the PT, reads the SIC from the data page, decrypts/authenticates (using the MAC and the IV), and returns the decrypted data.

Figure 11:
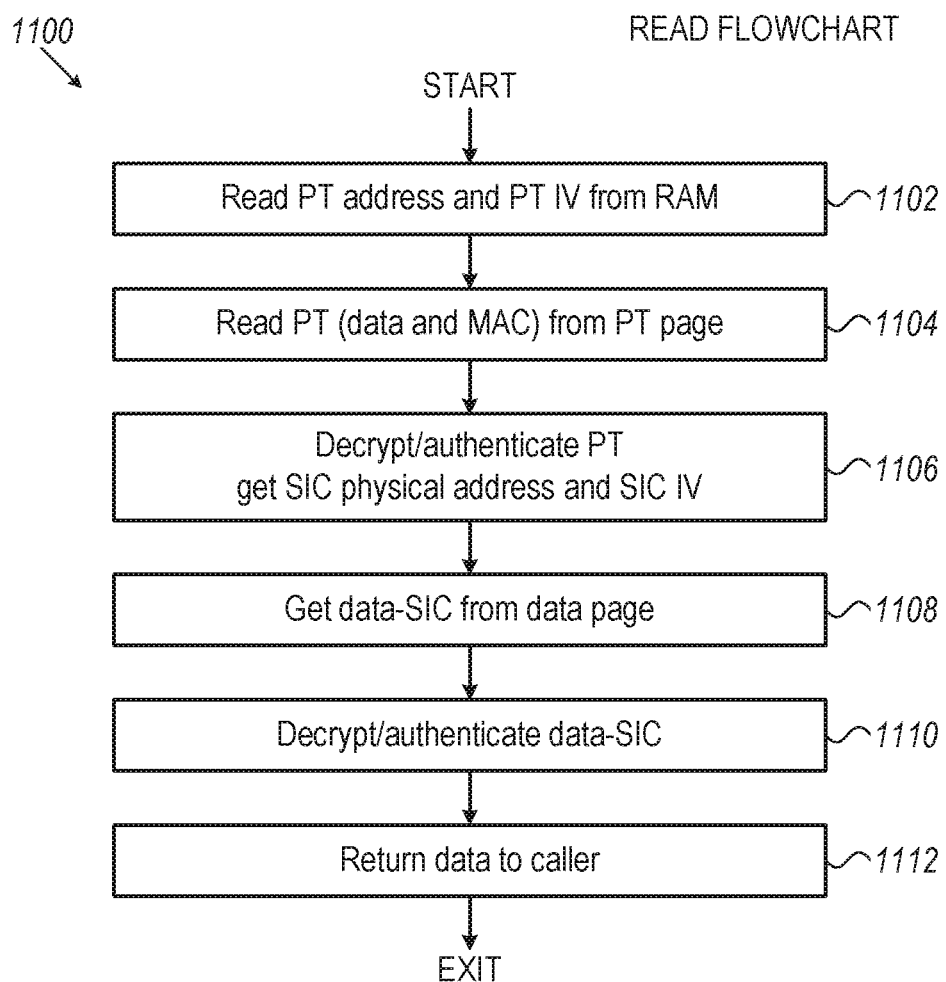
FIG. 11 is a flow chart that schematically illustrates a method for reading data from the Flash, in accordance with an embodiment of the present invention.

FIG. 11 is a flowchart 1100 that schematically illustrates a method for reading data from the Flash, in accordance with an embodiment of the present invention. The flowchart is executed by CPU 102 (FIG. 1), in response to a Read indication that FTL 202 receives from high-level-software 204 (FIG. 2). The flow starts at a Reading-PT-Address-and-IV step 1102, wherein the CPU reads a PT Physical Address 1008 (that corresponds to the logical address that the CPU receives, in increments of 64 bytes) and a PT IV 1010 from RAM table 1002 (FIG. 10). Next, in a Reading PT step 1104, the CPU reads a PT entry from a PT page, corresponding to the physical address that the CPU read in step 1102.

The CPU then, in a Decrypting/Authenticating PT step 1106, decrypts the PT entry, using the PT data, the PT MAC, and the IV, which was read in step 1104. The decrypted data comprises the physical address and the IV of the data-SIC that corresponds to the logical address.

If, in step 1106, the authentication fails, the CPU may abort or otherwise notify the user that Flash data is corrupted. If the authentication succeeds, the CPU will enter a Getting Data SIC step 1108, wherein the CPU uses the address (from step 1106) to read a SIC entry from a data page, and then enters a Decrypting/Authenticating Data-SIC step 1110.

In step 1110 the CPU decrypts and authenticates the data-SIC with the data-SIC MAC and the corresponding IV (that was decrypted in step 1106).

If, in step 1110, the authentication fails, the CPU may abort or otherwise notify the user that Flash data is corrupted. If the authentication succeeds, the CPU will enter a Returning Data step 1112, wherein the FTL will return the read data to the calling High-Level Software, and the flow will end.

As would be appreciated, the Read flowchart described hereinabove is cited by way of example. Read flows in accordance with the disclosed techniques are not limited to the description hereinabove. In alternative embodiments, for example, the authentication and/or the decrypting may be done by a hardware accelerator rather than by the CPU; in some embodiments, reading a page may comprise error detection and correction.

Write Flow

We will now proceed to describe a Write Flow, according to embodiments of the present invention. As the written data is typically shorter than a data SIC (write is typically done in widths of up to 8 bytes, whereas the width of the SIC is 64 bytes), any Write to a data-SIC results in a read-modify-write sequence, wherein the full SIC is read, the written part is modified, and the new SIC modified data is written back to the SIC.

Figure 12:
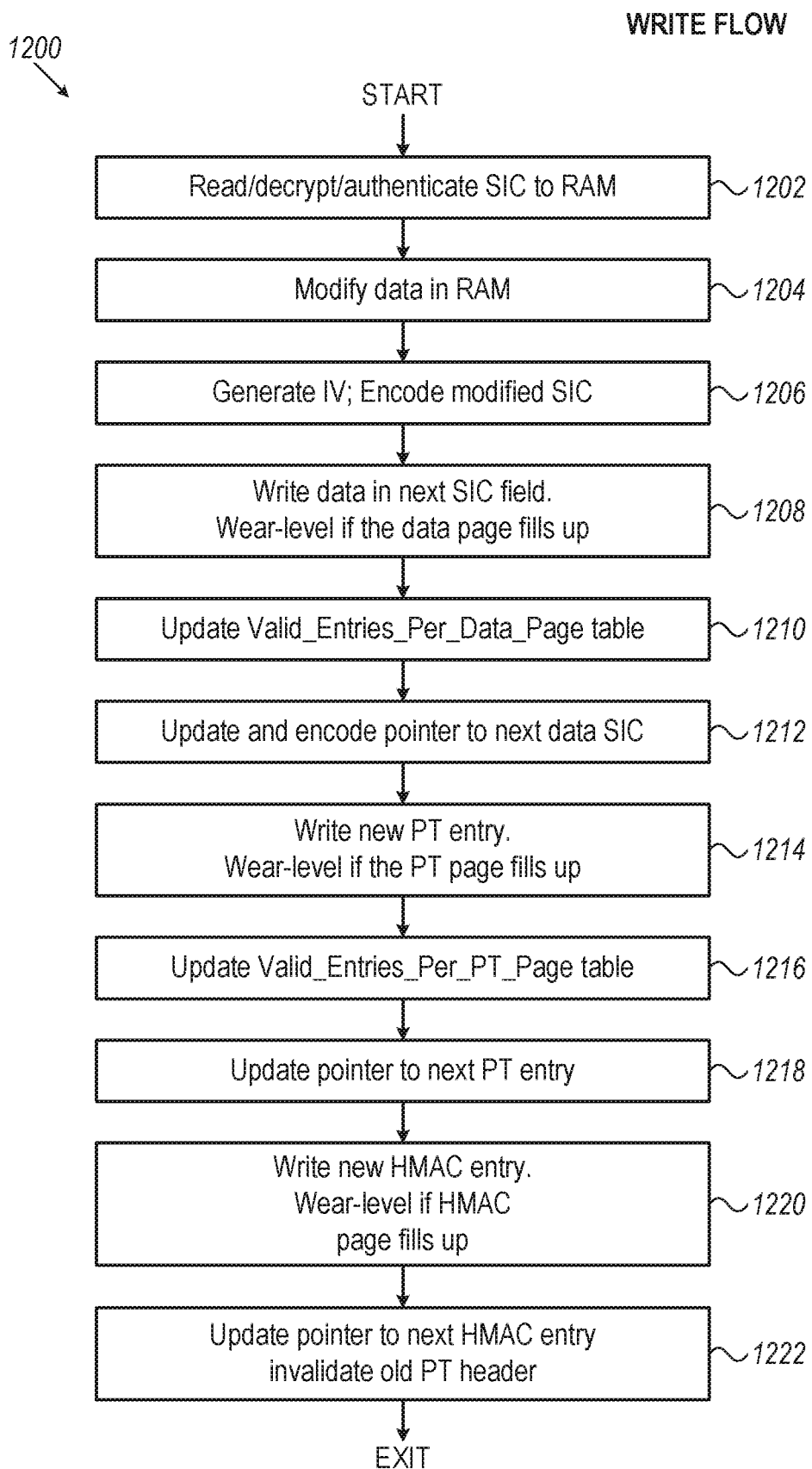
FIG. 12 is a flow chart that schematically illustrates a method for writing data in the Flash, in accordance with an embodiment of the present invention.

FIG. 12 is a flowchart 1200 that schematically illustrates a method for writing data in the Flash, in accordance with an embodiment of the present invention. The flowchart is executed by CPU 102, in response to a Write indication that FTL 202 receives from high-level-software 204 (FIG. 2).

In the example embodiment illustrated in FIG. 12, after the CPU writes the last entry of a page, the CPU enters a Wear-Levelling sequence wherein a page with the lowest erase count is evacuated, defragmented and stored in a free page, and the evacuated page turns into a free page. In the following step of flow 1200, when the CPU updates the number of valid entries in the page, the new number will equal the full capacity of a page, and in the next step, when the CPU updates the pointer to the next entry (in RAM), the pointer will point at a first entry in the evacuated page (if wear levelling was not entered, updating the pointer comprises incrementing the pointer). For clarity, the wear-levelling sequence is not illustrated in FIG. 12 (it will be described hereinbelow, with reference to FIG. 13).

The flow of FIG. 12 starts at a Reading step 1202, wherein the CPU executes a Read flow, including decryption an authentication. The Read flow may be identical to Read Flowchart 1100 (FIG. 11), except that no data is returned to the caller (in step 1112) and, instead, the decrypted SIC is stored in the RAM.

Next, in a Modifying Data step 1204, the CPU replaces corresponding bytes of the decrypted SIC with the written data. The CPU then enters an Encoding SIC step 1206, wherein the CPU generates an IV (for example, using a random number generator) and encodes the modified SIC, using, for example, AES128-GCM.

After step 1206, the CPU, in a Writing SIC step 1208, gets the next-SIC address from RAM (pointer 1020, FIG. 10), and then programs the corresponding SIC in the Flash device with the encoded data derived in step 1208. If the written SIC is the last available entry of the page, the CPU executes (after writing the SIC) a Wear-Level sequence.

Next, in an Updating-Valid-Entries-Per-Page step 1210, the CPU updates the Valid-Entries-Per-data-Page table 1014 (FIG. 10), and then enters an Updating-Pointer-to-Next-SIC step 1212, wherein the CPU updates pointer 1020 (FIG. 10).

After step 1212, the CPU enters a Writing-New-PT-Entry step 1214, wherein the CPU updates the physical address and IV fields of the corresponding PT entry and PTH, including the encoding of the PT entry, using, for example, AES128-GCM. The PT-entry will now reflect the physical address in which the data SIC was written in step 1208, whereas the PTH will be updated with the logical address and the IV (generated in step 1206). The CPU fetches the address of the next PT entry pointer from RAM (1022, FIG. 10). If the PT entry that the CPU writes is the last available entry in the current PT page, the CPU will execute a wear-level sequence.

Next, the CPU enters an Updating-Valid-Entries-per-PT-Page step 1216, wherein the CPU updates the Valid-Entries-per-PT-Page table 1018 (FIG. 10) in RAM, and then enters an Updating-Next-PT-Entry step 1218, wherein the CPU updates pointer 1022 (FIG. 10).

The CPU now enters a Writing New HMAC step 1220, wherein the CPU calculates (e.g., using AES128) the HMAC of the new PT pages, and stores the result in the HMAC page, at Next HMAC Pointer 1024 (FIG. 10). If the HMAC entry that the CPU writes is the last available entry in the current page, the CPU will execute a wear-level sequence.

Lastly, The CPU enters an Updating-Next-HMAC pointer step 1222, updates Next-HMAC-Pointer 1024 (FIG. 10), invalidates the old PT header (by clearing the valid bit in the PT header) and exits the flow.

As would be appreciated, the Write flowchart described hereinabove is cited by way of example. Write flows in accordance with the disclosed techniques are not limited to the description hereinabove. In alternative embodiments, for example, the order of some of the steps may change; in other embodiments, encoding data SIC (step 1206) and/or PT-entry (step 1212) comprises generating an ECC code of the encoded data.

Wear Levelling

In embodiments according to the present invention, each of the Flash pages comprises an Erase Count, and the FTL is configured to evenly distribute the erasures between the pages, so as to avoid immature wear of the Flash device. Such even distribution is referred to as Wear Leveling.

When a Flash page (data, PT or HMAC) fills up, the page typically stores one or more invalid entries (e.g., entries that were replaced by new entries); therefore, in most cases, it is possible to compress the valid data, and make room for more entries. The process of compressing the valid data is referred to hereinbelow as Defragmentation, and the corresponding verb is referred to as Defrag.

However, the page that fills up may have been erased more than other pages, and, therefore, it may be preferable to defrag another page—one with a low number of erasures.

In embodiments according to the present invention, when any page fills up, the FTL defrags the page with a minimum number of erasures; if that page does not have invalid entries, the FTL defrags an additional page—one that has the lowest number of erasures from all pages that have at least one invalid entry.

Figure 13:
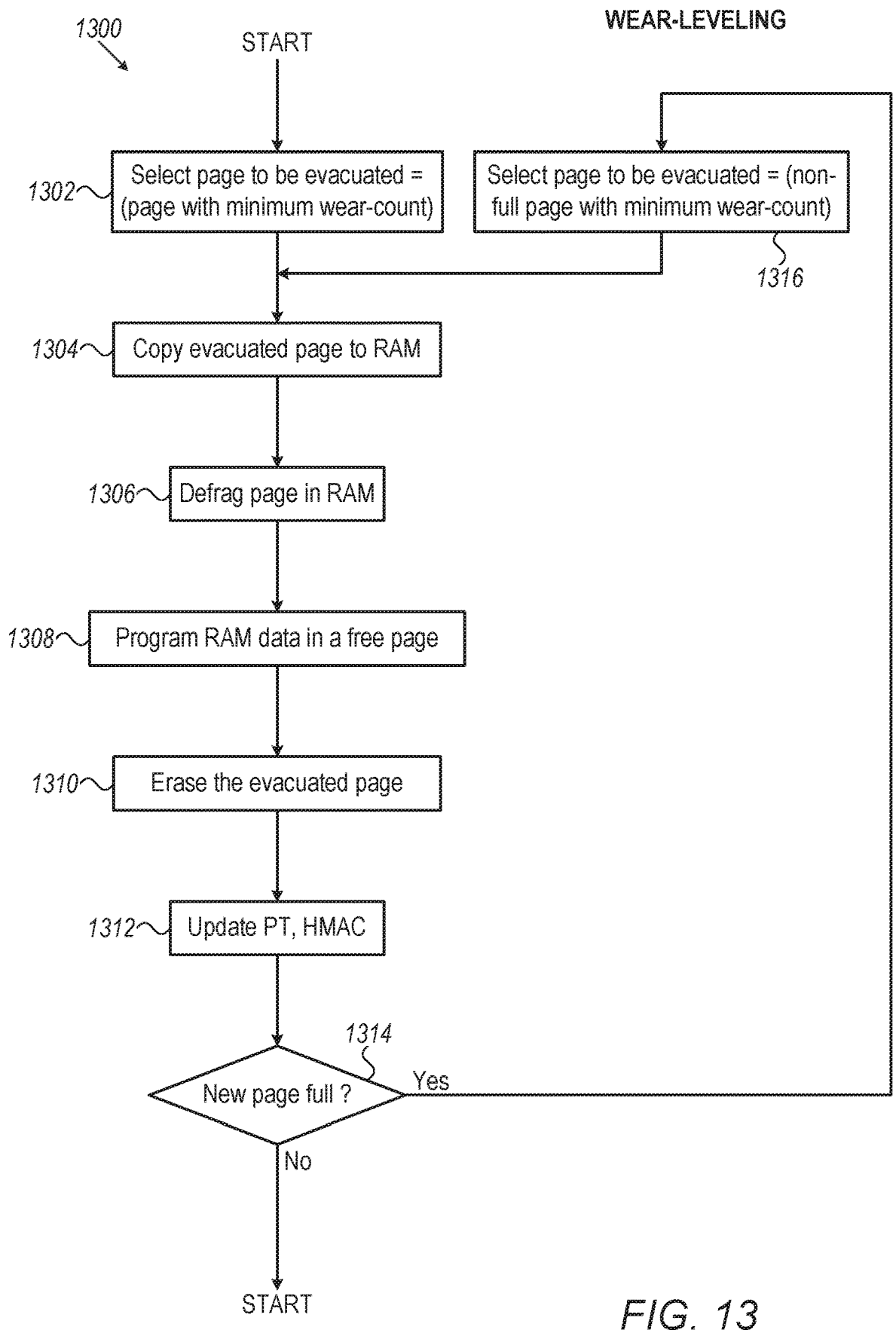
FIG. 13 is a flow chart that schematically illustrates a method for wear-levelling a Flash, in accordance with an embodiment of the present invention.

FIG. 13 is a flowchart 1300 that schematically illustrates a method for wear-levelling a Flash device, in accordance with an embodiment of the present invention. The flowchart is executed by CPU 102 and is initiated after the CPU writes the last valid entry of a page (for example, in steps 1208, 1214 and 1218, FIG. 12).

The flow starts at a Selecting-Page step 1302, wherein the CPU reads the erase count of all pages and selects the page with the lowest erase count, which will be evacuated (if there is more than one page with the lowest number of erasures that has at least one invalid entry, the one with the maximum invalid entries will be evacuated).

Next, in a Copying Evacuated Page step 1304, the CPU will read the contents of the selected page and store the contents in the RAM. The CPU will then enter a Defrag step 1306 and defrag the copied data (e.g., write all the valid entries in contiguous locations in RAM), and proceed to a Programming Free Page step 1308.

In step 1308 the CPU programs one of the free pages with the data in the RAM. The programming comprises changing the type field from Free to the type of the evacuated page, and keeping the erase count (hence, the CPU first reads the erase-count field from the free page).

In some alternative embodiments, to reduce RAM usage, steps 1304, 1306 and 1308 may be merged, and done by consecutively reading entries from the evacuated page and writing the valid entries in the free page; thus, rather than allocating RAM space equals to a full page, the allocated space will be equal to one entry only.

The CPU then enters an Erasing Page step 1310, wherein the CPU reads the Erase-Count field of the page to be evacuated, erases the page, and then programs the erase-count field of the page with an incremented erase-count value, and the page-type field with Free page indication.

The CPU then enters an Updating-PT-and-HMAC step 1312 wherein the CPU updates the PT entries and then recalculates and programs the HMAC. If, when updating the PT or the HMAC, a page is filled up, wear levelling flow 1300 is recursively called.

Next, the CPU enters a Checking-Page-Full step 1314, and checks whether the evacuated page is completely full (in other words, did the page before the defrag contain non-valid entries). If the new page is not full, the flow ends. If, in step 1314, the new page is full, the CPU will enter a Selecting-non-full-Page step 1316, wherein the CPU selects, from all pages with at least one non-valid entry, the page with the minimum number of erasures. The CPU will then reenter step 1304, and repeat steps 1304 to 1314.

As would be appreciated, the Wear-Levelling flowchart described hereinabove is cited by way of example. Wear-Levelling flows in accordance with the disclosed techniques are not limited to the description hereinabove. In alternative embodiments, for example, the selected page in step 1316 may be chosen according to a weight function that is calculated according to the number of erasures and the number of invalid entries. In some embodiments, the CPU, in step 1304, copies only the valid entries, and step 1306 is skipped.

Power Drop Resiliency

The structure and methods that have been disclosed hereinabove guarantee that, in case power to computer system 100 (FIG. 1) and/or to the Flash device is interrupted at any point, the security of the system will not be compromised. Power drop may be detected in the next power up initialization, wherein the authentication will fail (step 912, FIG. 9).

In general, any power interruption that occurs during any Write transaction is either harmless, or will result in an inconsistent Flash data structure, which will be detected and fixed during initialization. Several examples will be described below.

1. If power is interrupted when the CPU writes new data in a data page, the PT will still point at the former data.

2. If power is interrupted after the CPU writes the data and before the CPU writes the new PT, the PT header will still point at the former PT, which points at the former data.

3. In case power interruption occurs between the writing of the PT entry and the writing of the PT header, the previous PT header still points at the previous PT, which points at the former data.

4. If power is interrupted while (or right before) the CPU writes the HMAC, HMAC authentication will fail when power is next renewed, and the CPU will use the previous PT-header, PT entry (and HMAC).

5. If power is interrupted occurs in the middle of defrag, after writing the page type (step 1308, FIG. 13), the number of the various types of pages will be wrong. In this case the FTL will defrag the extra page.

6. If power is interrupted before the page type is written, a page marked as empty will not be empty; to counter this eventuality, the CPU may verify, during initialization, that all empty pages are, indeed, empty.

7. If power is interrupted after HMAC is updated and before the previous PT header is invalidated, HMAC authentication will fail, and the CPU will invalidate the PT header.

Using Replay-Protected Monotonic Counters (RPMC)

In some embodiments according to the present invention, the Flash Device may comprise one or more RPMCs, which are operable to protect the Flash memory from rollback (sometimes called "replay"). As the count value that the RPMC generates is guaranteed to be unique, smaller IV fields may be used. (A description of RPMC can be found, for example, in U.S. Pat. No. 9,405,707, which describes a system including a Flash memory device that comprises an RPMC and a host device.)

In some embodiments, if the Flash device comprises at least one RPMC, the CPU is configured to:

1. Upon Flash Format, read the value of an RPMC and store it in a non-volatile register (in some embodiments this non-volatile register may be stored in a different Flash partition, signed by a different MAC. In another embodiment the non-volatile register is a second RPMC, and the CPU increments the second RPMC until it matches the value of the first RPMC). The contents of the non-volatile register will be referred to as Format-Version.

2. Prior to Writing HMAC Entry step 1220 (FIG. 12)—increment the RPMC; use the new value for the HMAC. Thus, every HMAC authentication will be done with the current RPMC value, and any rollback will be discovered.

3. Compress PT pages by using smaller IV fields—the 96 random bits described hereinabove (with reference to FIG. 5), can be replaced by a 32-bit counter that increments upon every Write; when encoding/decoding, the CPU will concatenate the value of Format-Version with the counter value—this will assure that the IV will be unique.

As would be appreciated, embodiments of the present invention that make use of one or more RPMCs in the Flash device are not limited to the description hereinabove, which is cited by way of example. Other suitable techniques may be employed to increase the security and/or decrease the sizes of the Flash tables.

The configurations and methods described hereinabove, including computer system 100, FTL 202, the configuration of the Flash (or a partition thereof) to pages 300, the configuration of the various page types (302, 304, 306), Format flow 800, Init flow 900, RAM Tables 1000, Read flow 1100, Write flow 1200, and Wear-Levelling flow 1300, which were described hereinabove are example configurations and flows that are depicted purely for the sake of conceptual clarity. In alternative embodiments, any other suitable configurations and flows can be used. Elements that are not mandatory for understanding of the disclosed techniques have been omitted from the figures for the sake of clarity.

The different computer system elements described hereinabove may be implemented using suitable hardware, such as in one or more Application-Specific Integrated Circuit (ASIC) or Field-Programmable Gate Arrays (FPGA), using software, or using a combination of hardware and software elements.

In some embodiments, CPU 102 comprises one or more general-purpose processors, which are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory, including a partition of Flash Memory 106.

According to some embodiments of the present invention, computer system 100 comprises a hardware security accelerator, which may be used for authentication and/or encryption/decryption. In an embodiment, the hardware security accelerator is embedded in CPU 102.

Although the embodiments described herein mainly address Flash-based secure computer systems, the methods and systems described herein can also be used in other suitable systems or applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing device, comprising:
a non-volatile memory (NVM) interface, configured to communicate with an NVM; and
a processor, configured to:
store in the NVM at least (i) data entries comprising data and (ii) mapping entries comprising mapping information that indicate physical addresses in which the data entries are stored in the NVM; and
verify authenticity of the data entries and of the mapping entries using a hierarchical authentication scheme in which (i) the data entries comprise first authentication information that authenticates the data, and (ii) the mapping entries comprise second authentication information that authenticates both the mapping information and the data entries.

2. The computing device according to claim 1, wherein the processor is configured to verify the authenticity of the data entries and of the mapping entries in response to an initialization indication.

3. The computing device according to claim 1, wherein, in response to writing data to the NVM, the processor is configured to update the hierarchical authentication scheme with (i) updated first authentication information reflecting the written data, and (ii) updated second authentication information reflecting the written data and the mapping information of the written data.

4. The computing device according to claim 1, wherein, in response to reading data from the NVM, the processor is configured to verify the authenticity of the read data using at least the first authentication information and the second authentication information.

5. The computing device according to claim 1, wherein the processor is configured to update the hierarchical authentication scheme in an order that guarantees consistency of the data and the hierarchical authentication scheme in the event of a power interruption.

6. The computing device according to claim 1, wherein, as part of the hierarchical authentication scheme, the processor is further configured to store in the NVM third authentication information that authenticates the mapping entries.

7. A computing method, comprising:
storing in a non-volatile memory (NVM) at least (i) data entries comprising data and (ii) mapping entries comprising mapping information that indicate physical addresses in which the data entries are stored in the NVM; and
verifying authenticity of the data entries and of the mapping entries using a hierarchical authentication scheme in which (i) the data entries comprise first authentication information that authenticates the data, and (ii) the mapping entries comprise second authentication information that authenticates the both the mapping information and the data entries.

8. The computing method according to claim 7, wherein verifying the authenticity of the data entries and of the mapping entries is performed in response to an initialization indication.

9. The computing method according to claim 7, and comprising, in response to writing data to the NVM, updating the hierarchical authentication scheme with (i) updated first authentication information reflecting the written data, and (ii) updated second authentication information reflecting the written data and the mapping information of the written data.

10. The computing method according to claim 7, wherein verifying the authenticity of the data entries comprises, in response to reading data from the NVM, the verifying the authenticity of the read data using at least the first authentication information and the second authentication information.

11. The computing method according to claim 7, and comprising updating the hierarchical authentication scheme in an order that guarantees consistency of the data and the hierarchical authentication scheme in the event of a power interruption.

12. The computing method according to claim 7, and comprising, as part of the hierarchical authentication scheme, storing in the NVM third authentication information that authenticates the mapping entries.

\* \* \* \* \*